United States Patent Office 3,720,628
Patented Mar. 13, 1973

3,720,628
HYDROCARBON ISOMERIZATION CATALYST
AND PROCESS
John C. Hayes, Palatine, Roy T. Mitsche, Island Lake, Richard E. Rausch, Mundelein, and Frederick C. Wilhelm, Arlington Heights, Ill., assignors to Universal Oil Products Company, Des Plaines, Ill.
No Drawing. Continuation-in-part of application Ser. No. 34,539, May 4, 1970. This application July 17, 1970, Ser. No. 56,008
Int. Cl. B01j 11/78, 11/40
U.S. Cl. 252—442  3 Claims

ABSTRACT OF THE DISCLOSURE

Isomerizable hydrocarbons such as paraffins, cycloparaffins, olefins, and alkyl aromatics are isomerized by utilizing a catalytic composite containing catalytically effective amounts of a platinum group component and a Group IV-A metallic component combined with a carrier material of alumina and a finely divided crystalline aluminosilicate such as mordenite. Also disclosed is a catalytic composite comprising a platinum group component, a Group IV-A metallic component and a Friedel-Crafts metal halide component combined with a carrier material of alumina and a finely divided crystalline aluminosilicate.

CROSS-REFERENCES TO RELATED APPLICATIONS

This application is a continuation-in-part of our co-pending application, Ser. No. 34,539, filed May 4, 1970, now Pat. No. 3,660,309, May 2, 1972 the teachings of which are specifically incorporated herein.

BACKGROUND OF THE INVENTION

This invention relates to a process for isomerizing isomerizable hydrocarbons, and in particular isomerizable paraffins, cycloparaffins, olefins and alkyl aromatics. More particularly, this invention relates to a process for isomerizing isomerizable hydrocarbons with a catalytic composite comprising a platinum group component and a Group IV-A metallic component combined with a carrier material containing alumina and a finely divided crystalline aluminosilicate.

Isomerization processes for the isomerization of hydrocarbons have acquired significant importance within the petrochemical and petroleum refining industry. This importance stems from the demand for xylene isomers, particularly para-xylene, and has resulted in a need for processes for isomerizing C alkyl aromatics to obtain the desired para-xylene isomer. Also, the need for branched paraffins such as isobutane, isopentane, and the isooctanes, either as motor fuels or intermediates for the production of high octane motor fuel alkylates, can be met by isomerizing the corresponding normal paraffins. Further, in motor fuel produced by alkylation, it is desired that the final alkylate be highly branched. This can be accomplished by alkylating isobutane or isopentane with a $C_4$-$C_7$ internal olefin which in turn can be produced by the isomerization of the linear alpha-olefin by shifting the double bond to a more central position.

SUMMARY OF THE INVENTION

Accordingly, it is an object of the present invention to provide a process for isomerizing isomerizable hydrocarbons. More specifically, it is an object of this invention to provide an isomerization process utilizing a particular isomerization catalyst effective in isomerizing isomerizable hydrocarbons in an active, selective and stable manner.

In a broad embodiment, this invention relates to a process for isomerizing an isomerizable hydrocarbon which comprises contacting said hydrocarbon, at isomerization conditions, with a catalytic composite comprising catalytically effective amounts of a platinum group component and a Group IV-A metallic component combined with a carrier material containing alumina and a finely divided crystalline aluminosilicate. Preferably, the crystalline aluminosilicate utilized is mordenite and comprises about 0.5 to about 20 wt. percent of the carrier material with the carrier material being formed from an aluminum hydroxyl chloride sol, distributing a finely-divided crystalline aluminosilicate throughout the sol, gelling the resultant mixture to produce a hydrogel and calcining the resulting hydrogel. Further, the platinum group component is about 0.01 to about 2 wt. percent of the composite and the Group IV-A metallic component is about 0.01 to about 5 wt. percent of the composite.

In a more specific embodiment, this invention relates to the isomerization of saturated hydrocarbons such as paraffins or cycloparaffins, olefinic hydrocarbons such as $C_4$-$C_7$ isomerizable olefins and alkylaromatic hydrocarbons such as a $C_8$ alkylaromatic hydrocarbon. Further, this invention relates to a process for the conversion of an isomerizable olefinic hydrocarbon to a more highly branched chain paraffin by contacting the olefin, in admixture with hydrogen, at hydroisomerization conditions with the aforedescribed catalytic composite.

In a more specific embodiment, this invention relates to a catalytic composite comprising catalytically effective amounts of a platinum group component, a Group IV-A metallic component and a Friedel-Crafts metal halide component, such as aluminum chloride, with a carrier material containing alumina and a finely divided crystalline aluminosilicate.

Other objects and embodiments referring to alternative isomerizable hydrocarbons, alternative catalytic compositions and particular isomerization conditions will be found in the following more detailed description of the process of the present invention.

DESCRIPTION OF PREFERRED EMBODIMENTS

The process of this invention is applicable to the isomerization of isomerizable saturated hydrocarbons including acyclic paraffins and cyclic naphthenes and is particularly suitable for the isomerization of straight chain or mildly branched chain paraffins containing 4 or more carbon atoms per molecule such as normal butane, normal pentane, normal hexane, normal heptane, normal octane, etc., and mixtures thereof. Cycloparaffins applicable are those ordinarily containing at least 5 carbon atoms in the ring such as alkylcyclopentanes and cyclohexanes, including methylcyclopentane, dimethylcyclopentane, cyclohexane, methylcyclohexane, dimethylcyclohexane, etc. This process also applies to the converison of mixtures of paraffins and/or naphthenes such as those derived by selective fractionation and distillation of straight-run natural gasolines and naphthas. Such mixtures of paraffins and/or naphthenes include the so-called pentane fractions, normal hexane fractions, and mixtures thereof. It is not intended to limit this invention to these enumerated saturated hydrocarbons, and it is contemplated that straight or branched chain saturated hydrocarbons containing up to about 20 carbon atoms per molecule may be isomerized according to the process of the present invention. Particularly preferred are the aliphatic $C_4$-$C_9$ paraffins.

The olefins applicable within the isomerization process of this invention are generally a mixture of olefinic hydrocarbons of approximately the same molecular weight including the 1-isomer, 2-isomer, and other position isomers, capable of undergoing isomerization to an olefin in which the double bond occupies a more centrally located position in the hydrocarbon chain. The process of this invention can be used to provide an olefinic feedstock, for motor fuel alkylation purposes, containing an optimum amount of the more centrally located double bond isomers, by converting the 1-isomer, or other near terminal position isomer, into olefins wherein the double bond is more centrally located in the carbon atom chain. The process of this invention is thus applicable to the isomerization of such isomerizable olefinic hydrocarbons as the isomerization of 1-butene to 2-butene, or the isomerization of 3-methyl-1-butene to 2-methyl-2-butene. Also the process of this invention can be utilized to shift the double mond of an olefinic hydrocarbon such as 1-pentene, 1-hexene, 2-hexene, and 4-methyl-1-pentene to a more centrally located position so that 2-pentene, 2-hexene, 3-hexene and 4-methyl-2-pentene, respectively, can be obtained. It is not intended to limit this invention to these enumerated olefinic hydrocarbons as it is contemplated that shifting of the double bond to a more centrally located position may be effective in straight or branched chain olefinic hydrocarbons containing up to about 20 carbon atoms per molecule. Preferred isomerizable hydrocarbons are the aliphatic $C_4$–$C_7$ mono-olefins.

The process of the present invention is not only applicable to the isomerization of the olefinic bond of the olefin but also to the isomerizaton of the carbon skeleton to produce branched-olefins such as the isomerization of 1-pentene to 3-methyl-1-butene and/or 2-methyl-2-butene. The process of this invention also includes the hydroisomerization of aliphatic olefins wherein the olefin is simultaneously hydrogenated and isomerized to produce a branched or more highly branched paraffin such as the hydroisomerization of a linear pentene (1-pentene, 2-pentene, etc.) to isopentane or the hydroisomerization of a linear hexene (1-hexene, 2-hexene, etc.) to a methyl pentane and/or dimethylbutanes.

These foregoing isomerizable olefinic and saturated hydrocarbons may be derived as selective fractions from various naturally-occurring petroleum streams either as individual components or, as certain boiling range fractions obtained by the selective fractionation and distillation of catalytically cracked gas oil. Thus, the process of this invention may be successfully applied to and utilized for complete conversion of isomerizable hydrocarbons when these isomerizable hydrocarbons are present in minor quantities in various fluid or gaseous streams. Thus the isomerizable olefinic and saturated hydrocarbons for use in the process of this invention need not be concentrated. For example, isomerizable hydrocarbons appear in minor quantities in various refinery streams, usually diluted with gases such as hydrogen, nitrogen, methane, ethane, propane, etc. These refinery streams containing minor quantities of isomerizable olefinic and saturated hydrocarbons are obtained in petroleum refineries and various refinery installations including thermal cracking units, catalytic cracking units, thermal reforming units, coking units, polymerization units, dehydrogenation units, etc. Such refinery offstreams have in the past often been burned for fuel value, since an economical process for the utilization of the hydrocarbon content has not been available. This is particularly true for refinery fluid streams known as off gas streams containing minor quantities of isomerizable olefinic and saturated hydrocarbons.

Further, the process of this invention is also applicable to the isomerization of isomerizable alkylaromatic hydrocarbons including ortho-xylene, meta-xylene, para-xylene, ethylbenzene, the ethyltoluenes, the trimethylbenzenes, the diethylbenzenes, the triethylbenzenes, normal propylbenzene, isopropylbenzene, etc., and mixtures thereof. Preferred isomerizable alkylaromatic hydrocarbons are the monocyclic alkylaromatic hydrocarbons, that is, the alkyl benzene hydrocarbons, particularly the $C_8$ alkylbenzenes and nonequilibrium mixtures of the various $C_8$ aromatic isomers. Higher molecular weight alkylaromatic hydrocarbons are also suitable. These include aromatic hydrocarbons produced by the alkylation of benzene with $C_9$–$C_{18}$ olefin polymers or linear $C_9$–$C_{18}$ olefin-acting compounds and used as intermediates in the preparation of sulfonated surface-active agents. Such products are frequently referred to in the art as alkylate and include hexylbenzenes, nonylbenzenes, dodecylbenzenes, pentadecylbenzenes, hexyltoluenes, nonyltoluenes, dodecyltoluenes, pentadecyltoluenes, etc. Other suitable alkyl-aromatic hydrocarbons include those alkylaromatic hydrocarbons with two or more aryl groups such as the alkyl-substituted diphenyls such as diphenyl methane, the alkyl-substituted tri-phenyls such as triphenyl methane, the alkyl-substituted fluorenes, the alkyl-substituted stilbenes, etc. Also include are those alkylaromatics containing condensed aromatic rings such as the alkylnaphthalenes, the alkylanthracenes, the alkylphenanthrenes, etc., however, in using these high-molecular weight alkylaromatics, it is important that these compounds exist in the liquid phase at isomerization conditions to avoid excessive cracking of these high molecular weight compounds.

'As previously indicated the catalyst utilized in the present invention comprises a carrier material containing alumina and a crystalline aluminosilicate having combined therewith a platinum group component and a Group IV–A metallic component. In addition, in some cases, the catalyst may contain a halogen component, or a sulfur component, or a Friedel-Crafts metal halide component. Considering first the alumina utilized in the present invention, it is preferred that the alumina be a porous, adsorptive, high surface area material having a surface area of about 25 to about 500 m.$^2$/gm. Suitable alumina materials are the crystalline aluminas known as gamma-, eta-, and theta-alumina with gamma-alumina giving best results. In addition, in some embodiments the carrier material may contain minor proportions of other well-known refractory inorganic oxides such as silica, zirconia, magnesia, etc. However, the preferred carrier material comprises substantially pure gamma-alumina containing a minor proportion of a finely divided crystalline aluminosilicate.

It is an essential feature of the present invention that the carrier material contain a finely divided crystalline aluminosilicate. As is well known to those skilled in the art, crystalline aluminosilicates (also known as "zeolites" and "molecular sieves") are composed of a three-dimensional interconnecting network structure of silica and alumina tetrahedra. The tetrahedra are formed by four oxygen atoms surrounding a silicon or aluminum atom, and the basic linkage between the tetrahedra are through the oxygen atoms. These tetrahedra are arranged in an ordered structure to form interconnecting cavities or channels of uniform size interconnected by uniform openings or pores. The ion-exchange property of these materials follows from the trivalent nature of aluminum which causes the alumina tetrahedra to be negatively charged and allows the association with them of cations in order to maintain electrical balance in the structure. The molecular sieve property of these materials flows from the uniform size of the pores thereof which can be correlated to the size of the molecules that are present in a mixture of molecules and used to separate molecules having a critical diameter less than or equal to the pore mouths of these crystalline aluminosilicates. For purposes of the present invention, it is preferred to use crystalline aluminosilicates having pore mouths of at least 5 angstroms in cross-sectional diameter, and more preferably about 5 to about 15 angstrom units. Ordinarily, the aluminosilicates are synthetically prepared in the alkali metal form with one alkali metal cation associated with each aluminum centered tetrahedra. This alkali metal cation may be thereafter ion-exchanged with polyvalent cations such as calcium, magnesium, beryllium, rare earth cations, etc. Another treatment of these alkali metal aluminosilicates involves ion-exchange with ammonium ions followed by thermal treatment, preferably about 300° F., to convert the aluminosilicate to the hydrogen form. When the crystalline aluminosilicates contain a high mole ratio of silica to alumina such as mordenite (for example, above 5), the material may be directly converted to an acid form in a suitable acid medium.

Although in some cases the polyvalent form of the aluminosilicate may be used in the present invention, it is preferred to use the hydrogen form, or a form—for example, the alkali metal form—which is convertable to the hydrogen form during the course of the hereinafter described preferred procedure for incorporation of the crystalline aluminosilicates in the carrier material.

The preferred crystalline aluminosilicates for use in the present invention are the hydrogen and/or polyvalent forms of synthetically prepared faujasite and mordenite. In fact, we have found best results with synthetic mordenite having an effective diameter of about 6 angstrom units and a mole ratio of silica to alumina of about 9 to 10, and more particularly, the hydrogen form of mordenite.

A particularly preferred crystalline aluminosilicate is acid-extracted mordenite having a $SiO_2/Al_2O_3$ ratio substantially above 10. One method of forming this material involves subjecting the ordinary form of mordenite having a $SiO_2/Al_2O_3$ of about 9 to 10 to the action of a strong acid such as hydrochloric acid, sulfuric acid, nitric acid, etc., at conditions effecting the removal or extraction of at least a portion of the aluminum from the mordenite. Typically this procedure can be used to obtain mordenite having a $SiO_2/Al_2O_3$ ratio of about 11:1 to about 25:1 or more.

Regarding the method of incorporating the crystalline aluminosilicate (hereinafter abbreviated to CAS) into the carrier material, we have found that best results were obtained by adding the CAS directly into an aluminum hydroxyl-chloride sol prior to its use to form the alumina carrier material. An advantage of this method is the relative ease with which the CAS can be uniformly distributed in the resulting carrier material. Additionally, the sol appears to react with the CAS causing some basic modification of the structure of the resulting material which enables it to have unusual ability to catalyze hydrocarbon isomerization reactions which depend on carbonium ion intermediates.

Accordingly, the preferred method for preparing the carrier material involves forming an aluminum hydroxyl chloride sol by digesting aluminum in HCl to result in a sol having a weight ratio of aluminum to chloride of about 1 to about 1.4; evenly distributing the CAS throughout the sol; gelling the resultant mixture to produce a hydrogel or particles of a hydrogel; then finishing the hydrogel into the carrier material by standard aging, washing, drying and calcination steps. See U.S. Pat. No. 2,620,314 for details as to one preferred method of forming the resultant mixture into spherical particles.

The amount of CAS in the resulting carrier material is preferably about 0.05 to about 75 wt. percent and more particularly, about 0.1 to about 20 wt. percent. For the isomerization embodiments, it is preferred to use about 1 to about 10 wt. percent CAS. By the expression "finely divided" it is meant that the CAS is used in a particle size having an average diameter of about 1 to about 100 microns, with best results obtained with particles of average diameter of less than 40 microns.

A preferred ingredient of the instant catalyst is a halogen component. Although the precise form of the chemistry of the association of the halogen component with the carrier material is not entirely known, it is customary in the art to refer to the halogen component as being combined with the alumina or with the other ingredients of the catalyst. This combined halogen may be either fluorine, chlorine, iodine, bromine, or mixtures thereof. Of these, fluorine and, particularly chlorine are preferred for the purposes of the present invention. The halogen may be added to the carrier material in any suitable manner, either during preparation thereof or before or after the addition of the catalytically active metallic components. For example, the halogen may be added at any stage of the preparation of the carrier material or to the calcined carrier material, as an aqueous solution of a suitable halogen-containing compound such as hydrogen fluoride, hydrogen chloride, hydrogen bromide, etc. The halogen component, or a portion thereof, may be combined with the carrier material during the impregnation of the latter with platinum group component; for example, through the utilization of a mixture of chloroplatinic acid and hydrogen chloride. In another situation, the aluminum hydroxylchloride hydrosol which is preferably utilized to form the carrier material inherently contains halogen and thus can contribute some portion of the halogen component to the final composite. In any event, the halogen is preferably combined with the carrier material in such a manner as to result in a final composite that contains about 0.1 to about 10 wt. percent and more preferably about 0.5 to about 5 wt. percent of halogen, calculated on an elemental basis.

It is essential that the catalyst contain a platinum group component. Although the process of the present invention is specifically directed to the use of a catalytic composite containing platinum or palladium, it is intended to include other platinum group metals such as rhodium, ruthenium, osmium and iridium. The platinum group component, such as platinum or palladium may exist within the final catalytic composite as a compound such as an oxide, sulfide, halide, etc., or as an elemental metal, or in combination with one or more of the other ingredients of the catalyst. Generally, the amount of the platinum group component present in the final catalyst is small compared to the quantities of the other components combined therewith. In fact, the platinum group metallic component generally comprises about 0.01 to about 2 wt. percent of the final catalytic composite, calculated on an elemental basis. Excellent results are obtained when the catalyst contains about 0.05 to about 1 wt. percent of the platinum group metal. This component is preferably platinum or a compound of platinum or palladium or a compound of palladium.

The platinum group component may be incorporated in the catalytic composite in any suitable manner such as coprecipitation or cogellation with the alumina carrier material, ion-exchange with the alumina hydrogel, or impregnation of the carrier material either after or before calcination of the alumina hydrogel, etc. The preferred method of incorporating this component involves the utilization of a soluble decomposable compound of a platinum group metal to impregnate the carrier material. Thus, the platinum group metal may be added to the carrier material by commingling the latter with an aqueous solution of chloroplatinic acid. Other water-soluble compounds of platinum may be employed as impregnation solutions and include ammonium chloroplatinate, bromoplatinic acid, platinum chloride, dinitrodiaminoplatinum, palladium nitrate, chloropalladic acid, etc. The utilization of a platinum chloride compound, such as chloroplatinic acid or chloropalladic acid, is preferred since its facilitates the incorporation of both the platinum group component and at least a minor quantity of the preferred halogen component in a single step. Hydrogen chloride or the like acid is also generally added to the impregnation solution in order to further facilitate the incorporation of the halogen component and the distribution of the metallic components. In addition, it is generally preferred to impregnate the carrier material after it has been calcined in order to minimize the risk of washing away the valuable platinum metal compounds; however, in some cases it may be advantageous to impregnate the carrier material when it is in a gelled state.

Another essential constituent of the instant catalytic composite is the Group IV–A metallic component. By the use of the generic term "Group IV–A metallic component" it is intended to cover the metals and compounds of the metals of Group IV–A of the Periodic Table. More specifically, it is intended to cover germanium and the compounds of germanium; tin and the compounds of tin, lead and the compounds of lead and mixtures of these metals and/or compounds of metals. This Group IV-A metallic component may be present in the catalytic composite as an elemental metal, or in chemical combination with one or more of the other ingredients of the composite, or as a chemical compound of the Group IV-A metal such as the oxide, sulfide, halide, oxyhalide, oxychloride, aluminate and the like compounds. Based on the evidence currently available, it is believed that best results are obtained when the Group IV-A metallic component exists in the final composite in an oxidation state above that of the elemental metal, and the subsequently described oxidation and reduction steps, that are preferably used in the preparation of the instant composite are believed to result in a catalytic composite which contains an oxide of the Group IV-A metallic component such as germanium oxide, tin oxide and lead oxide. Regardless of the oxidation state in which this component exists in the composite, it can be utilized therein in any amount which is catalytically effective, with the preferred amount being about 0.01 to about 5 wt. percent thereof, calculated on an elemental basis. The exact amount selected within this broad range is preferably determined as a function of the particular Group IV-A metal that is utilized. For instance, in the case where this component is lead, it is preferred to select the amount of this component from the low end of this range—namely, about 0.01 to about 1 wt. percent. Additionally, it is preferred to select the amount of lead as a function of the amount of platinum group component as will be explained hereinafter. In the case where this component is tin, it is preferred to select from a relatively broader range of about 0.05 to about 2 wt. percent thereof. And, in the preferred case, where this component is germanium, the preferred selection can be made from the full breadth of the stated range—specifically, about 0.01 to about 5 wt. percent, with best results at about 0.05 to about 2 wt. percent. This Group IV-A component may be incorporated in the composite in any suitable manner known to the art such as by coprecipitation or cogellation with the carrier material, ion exchange with the carrier material, or impregnation of the carrier material at any stage in its preparation. It is to be noted that it is intended to include within the scope of the present invention all conventional procedures for incorporating a metallic component into a catalytic composite, and the particular method of incorporation used is not deemed to be an essential feature of the present invention. However, best results are believed to be obtained when the Group IV-A component is uniformly distributed throughout the carrier material. One acceptable method of incorporating the Group IV-A component into the catalytic composite involves cogelling the Group IV-A component during the preparation of the carrier material. This method typically involves the addition of a suitable soluble compound of the Group IV-A metal of interest to the alumina hydrosol. The resulting mixture is then commingled with a suitable gelling agent, such as a relatively weak alkaline reagent, and the resulting mixture is thereafter preferably gelled by dropping into a hot oil bath as explained hereinbefore. After aging, drying and calcining the resulting particles there is obtained an intimate combination of the oxide of the Group IV-A metal and alumina. One preferred method of incorporating this component into the composite involves utilization of a soluble, decomposable compound of the particular Group IV-A metal of interest to impregnate the carrier material either before, during or after the carrier material is calcined. In general, the solvent used during this impregnation step is selected on the basis of its capability to dissolve the desired Group IV-A compound without affecting the carrier material which is to be impregnated. Ordinarily, good results are obtained when water is the solvent; thus the preferred Group IV-A compounds for use in this impregnation step are typically water-soluble and decomposable. Examples of suitable Group IV-A compounds are germanium difluoride, germanium tetrafluoride, germanium monosulfide, tin dibromide, tin dibromide di-iodide, tin dichlorde diiodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. In the case where the Group IV-A component is germanium, a preferred impregnation solution is germanium tetrachloride dissolved in anhydrous ethanol. In the case of tin, tin chloride dissolved in water is preferred. Regardless of which impregnation solution is utilized, the Group IV-A component can be impregnated either prior to, simultaneously with, or after the platinum group component is added to the carrier material. Ordinarily, best results are obtained when this component is impregnated simultaneously with the platinum group component. Likewise, best results are obtained when the Group IV-A component is germanium or a compound of germanium.

Regardless of which Group IV-A compound is used in the preferred impregnation step, it is important that the Group IV-A metallic component be uniformly distributed throughout the carrier material. In order to achieve this objective it is necessary to maintain the pH of the impregnation solution in a range of about 1 to about 7 and to dilute the impregnation solution to a volume which is substantially in excess of the volume of the carrier material which is impregnated. It is preferred to use a volume ratio of impregnation solution to carrier material of at least 1.5:1 and preferably about 2:1 to about 10:1 or more. Similarly, it is preferred to use a relatively long contact time during the impregnation step ranging from about ¼ hour up to about ½ hour or more before drying to remove excess solvent in order to insure a high dispersion of the Group IV-A metallic component on the carrier material. The carrier material is, likewise preferably constantly agitated during this preferred impregnation step.

Regarding the preferred amounts of the metallic components of the instant catalyst, we have ascertained that it is a good practice to specify the amount of the group IV-A metallic component as a function of the amount of the platinum group component. Broadly, the amount of the Group IV-A metallic component should be sufficient to result in an atomic ratio of Group IV-A metal to platinum group metal falling within the range of about 0.05:1 to about 10:1. More specifically, it is a preferred practice to select this ratio from the following ranges for the individual Group IV-A species: (1) germanium, about 0.3:1 to 10:1, with best results at about 0.6:1 to 6:1; (2) tin, about 0.1:1 to 3:1 with best results at about 0.5:1 to 1.5:1; and (3) lead, about 0.05:1 to 0.9:1 with best results at about 01:1 to 0.75:1.

Regardless of the details of how the components of the catalyst are combined with the carrier material, the final catalyst generally will be dried at a temperature of about 200 to about 600° F. for a period of from about 2 to about 24 hours or more, and finally calcined at a temperature of about 700° F. to about 1100° F. in an air atmosphere for a period of about 0.5 to about 10 hours in order to convert the metallic components substantially to oxide form. Best results are generally obtained when the halogen content of the catalyst is adjusted during the calcination step by including a halogen-containing compound in the air atmosphere utilized. In particular, when the desired halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.1 to about 10 wt. percent.

Although not essential, the resulting calcined catalytic composite can be impregnated with an anhydrous Friedel-Crafts type metal halide, particularly aluminum chloride. Other suitable metal halides include aluminum bromide, ferric chloride, ferric bromide, zinc chloride, beryllium chloride, etc. It is preferred that the porous carrier material of alumina and CAS contain chemically combined hydroxyl groups. The presence of chemically combined hydroxyl groups in the porous carrier material allows a reaction to occur bewteen the Friedel-Crafts metal halide and the hydroxyl groups of the carrier material. For example, aluminum chloride reacts with the hydroxyl groups of the alumina and CAS to yield Al-O-AlCl$_2$ active centers which enhance the catalytic behavior of the original composite, particularly for isomerizing $C_4$–$C_9$ paraffins. It is desired that the combined halogen content presently within the calcined composite be within the lower portion of the 0.1 to 10 wt. percent halogen range and this combined halogen substitutes to some degree for the hydroxyl groups which are necessary for the reaction with the Friedel-Crafts metal halide.

The Friedel-Crafts metal halide can be impregnated onto the calcined catalytic composite containing combined hydroxyl groups by the sublimation of the halide onto the composite under conditions such that the sublimed metal halide is combined with the hydroxyl groups of the composite as illustrated by U.S. Pat. No. 2,999,074. This reaction is typically accompanied by the elimination of about 0.5 to about 2.0 moles of hydrogen chloride per mole of Friedel-Crafts metal halide reacted. For example, in the case of subliming aluminum chloride which sublimes at about 184° C., suitable impregnation temperatures range from about 190° C. to about 700° C., preferably from about 200° C. to about 600° C. The sublimation can be conducted at atmospheric pressure or under increased pressure and in the presence of diluents such as inert gases, hydrogen, and/or light paraffinic hydrocarbons. This impregnation may be conducted batchwise but a preferred method is to pass sublimed AlCl$_3$ vapors in admixture with an inert gas such as hydrogen through a calcined catalyst bed. This method both continuously deposits the aluminum chloride and removes the evolved HCl.

The amount of halide combined with the composite may range from about 1% to about 100% of the original metal halide-free composite. The final composite has unreacted metal halide removed by treating the composite at a temperature above the sublimation temperature of the halide for a time sufficient to remove therefrom any unreacted metal halide. For AlCl$_3$, temperatures of about 400° C. to about 600° C. and times of from about 1 to about 48 hours are sufficient.

It is preferred that the resultant calcined catalytic composite be subjected to a substantially water-free reduction step prior to its use in the conversion of hydrocarbons. This step is designed to insure a uniform and finely divided dispersion of the platinum group component throughout the carrier material. Preferably, substantially pure and dry hydrogen (i.e., less than 20 vol. p.p.m. H$_2$O) is used as the reducing agent in this step. The reducing agent is contacted with the calcined catalyst at conditions including a temperature of about 800° F. to about 1200° F. and times of about 0.5 to about 10 hours or more selected to reduce at least the platinum group component to the elemental metallic state. This reduction treatment may be performed in situ as part of a start-up sequence if precautions are taken to predry the plant to a substantially water-free state and if substantially water-free hydrogen is used.

Although it is not essential, the resulting reduced catalytic composite may, in many cases, be beneficially subjected to a presulfiding operation designed to incorporate in the catalytic composite from about 0.05 to about 0.5 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas, such as a mixture of hydrogen and hydrogen sulfide in a mole ratio of about 10:1 moles of H$_2$ per mole of H$_2$S, at conditions sufficient to effect the desired incorporation of sulfur, generally including a temperature ranging from about 50° F. up to about 1100° F. or more. It is generally a good practice to perform this optional presulfiding step under substantially water-free conditions.

According to the present invention, the isomerizable hydrocarbon charge stock and hydrogen are contacted with a catalyst of the type hereinbefore described in a hydrocarbon isomerization zone at hydrocarbon isomerization conditions. This contacting may be accomplished by using the catalyst in a fixed bed system, a moving bed system, a fluidized bed system, or a batch type operation; however, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and then are passed, into an isomerization zone containing a fixed bed of the catalyst type previously characterized. It is, of course, understood that the isomerization zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion. In addition, it is to be noted that the reactants may be in the liquid phase, a mixed liquid-vapor phase, or a vapor phase when they contact the catalyst with best results obtained in the vapor phase.

The process of this invention, utilizing the catalyst hereinbefore set forth, for isomerizing isomerizable saturated hydrocarbons is preferably effected in a continuous flow, fixed bed system. One particular method is continuously passing the hydrocarbon, in admixture with hydrogen, to a reaction zone containing the catalyst and maintaining the zone at proper isomerization conditions such as a temperature in the range of about 0° to about 450° C. or more, preferably 50° C. to 425° C., a pressure of about atmospheric to about 200 atmospheres or more and a mole ratio of hydrogen to hydrocarbon of about 0.1 to 10.0 or more. The hydrocarbon is passed over the catalyst at a liquid hourly space velocity (defined as volume of liquid hydrocarbon passed per hour per volume of catalyst) of from about 0.1 to about 20 hr.$^{-1}$ or more. In addition, diluents such as argon, nitrogen, etc. may be present. The isomerized product is continuously withdrawn, separated from the reactor effluent, and recovered by conventional means, preferably fractional distillation, while the unreacted starting material may be recycled to form a portion of the feedstock.

Likewise, the process of this invention for isomerizing an isomerizable alkylaromatic hydrocarbon is also preferably effected by passing the aromatic to a reaction zone containing the hereinbefore described catalyst and maintaining the zone at proper alkylaromatic isomerization conditions such as a temperature in the range of about 0° C. to about 600° C. or more preferably, from about 200° C. to about 600° C., and a pressure of atmospheric to about 100 atmospheres or more. The hydrocarbon is passed, in admixture with hydrogen, at a liquid hourly hydrocarbon space velocity of about 0.1 to about 20 hrs.$^{-1}$ or more and a hydrogen to hydrocarbon mole ratio of about 0.5:1 to about 20:1. Other inert diluents such as nitrogen, argon, etc. may also be present. The isomerized product is continually withdrawn, separated from the reactor effluent by conventional means such as fractional distillation or crystallization, and recovered.

The process of this invention, utilizing the catalyst hereinbefore set forth, for isomerizing or hydroisomerizing isomerizable olefinic hydrocarbons is also preferably effected in a continuous flow, fixed bed system. One particular method is continuously passing the hydrocarbon, in admixture with hydrogen, to a reaction zone containing the catalyst and maintaining the zone at proper isomerization conditions such as a temperature in the range of about 0° to about 450° C. or more, a pressure of about atmospheric to about 200 atmospheres or more and a mole ratio of hydrogen to hydrocarbon of about 0.1 to 10 or more. When effecting a hydroisomerization reaction, namely the conversion of an olefin to a branched or more highly branched paraffin, hydrogen to hydrocarbon mole ratios of at least 1:1 are preferred. The hydrocarbon is passed over the catalyst at a liquid hourly space velocity (defined as volume of liquid hydrocarbon passed per hour per volume of catalyst) of from about 0.1 to about 20 hr.$^{-1}$ or more. In addition, diluents such as argon, nitrogen, etc. may be present. The isomerized product is continuously withdrawn, separated from the reactor effluent, and recovered by conventional means, preferably fractional distillation, while the unreacted starting material may be recycled to form a portion of the feedstock. Preferably conditions to be utilized for the isomerization of olefins without hydrogenation of the olefin include temperatures of about 0° C. to about 300° C., and pressures of about atmospheric to about 50 atmospheres. Preferred conditions for hydroisomerization, however, include temperatures of 100° C. to about 450° C., pressures of 30 to 200 atmospheres, hydrogen to hydrocarbon mole ratios of about 2:1 to about 10:1 or more and generally lower space velocities and higher temperatures than those utilized when solely isomerizing olefins without effecting the production of paraffins. Thus, hydrogenating conditions are desired in hydroisomerization in a manner well known to those trained in the art.

ILLUSTRATIVE EMBODIMENT

The following illustrations are given to illustrate the preparation of the catalyst composite to be utilized in the process of this invention and its use in the isomerization of isomerizable hydrocarbons. However, these examples are not presented for purposes of limiting the scope of this invention but in order to further illustrate the embodiments of the present process.

ILLUSTRATION I

Aluminum metal having a purity of 99.9 wt. percent is digested in hydrochloric acid to produce an aluminum hydroxylchloride sol having a weight ratio of Al/Cl of about 1.15 and a specific gravity of 1.3450. An aqueous solution containing 28 wt. percent HMT (i.e. hexamethylenetetramine) is made up, and 700 cc. of the HMT solution is then added to 700 cc. of the sol to form a dropping solution. About 10 grams of the hydrogen form of mordenite in the form of a fine powder is added to the resulting dropping solution and uniformly distributed therein. Another portion of the mordenite is chemically analyzed and contains 11.6 wt. percent $Al_2O_3$, 87.7 wt. percent $SiO_2$ and 0.2 wt. percent Na. Still another portion of the mordenite is analyzed for particle size distribution. The results show that 57.6 wt. percent of the powder is between 0 to 40 microns in size and 82.1 wt. percent of the powder is between 0 and 60 microns in size.

The dropping solution containing the dispersed mordenite is passed through a vibrating dropping head and dropped in discrete particles into a forming oil maintained at 95° C. The rate of vibration and the volumetric flow of dropping solution is set to produce finished spherical particles of about 3/16 inch in diameter. The dropped particles are aged in oil overnight (about 16 hours), separated from the oil and aged in an ammoniacal solution at 95° C. for about 3 hours. The aged spherical particles are then water washed to remove neutralization salts and dried. The particles are thereupon calcined at 600° C. for 4 hours in dry air to give a carrier material having an apparent bulk density of between 0.4 and 0.5 gm./cc.

A measured amount of germanium tetrachloride is then dissolved in anhydrous ethanol. The resulting solution is then aged at room temperature until an equilibrium condition is established therein. Another aqueous solution containing chloroplatinic acid and hydrogen chloride is then prepared. The two solutions are then intimately admixed to prepare an impregnation solution.

About 250 cc. of the impregnation solution is then placed in a steam-jacketed rotating vessel and about 350 cc. of the carrier material is added thereto. The vessel is then heated and rotated until all the liquid solution is evaporated. The resulting catalyst particles are then subjected to an oxidation treatment in an air atmosphere at a temperature of 1025° F. for about 1 hour. The resulting catalyst particles are then analyzed and found to contain, on an elemental basis, about 0.375 wt. percent platinum, about 0.75 wt. percent chlorine, and about 0.5 wt. percent germanium. In addition, the alumina carrier material is found to contain about 5 wt. percent of the hydrogen form of mordenite.

ILLUSTRATION II

A portion of the catalyst produced by the method of Illustration I is placed in a continuous flow, fixed-bed isomerization plant of conventional design. Substantially pure meta-xylene is used as the charge stock. The charge stock is commingled with about 8 moles of $H_2$ per mole of hydrocarbon, heated to about 400° C., and continuously charged at LHSV of 4.0 hr.$^{-1}$ to the reactor containing the catalyst which is maintained at about a pressure of about 300 p.s.i.g. Substantial conversion of meta-xylene to para-xylene is obtained.

ILLUSTRATION III

Another portion of the catalyst produced by Illustration I is used to isomerize ethylbenzene. The reactor is maintained at 300 p.s.i.g. and 350° C. as ethylbenzene, commingled with 8 moles of $H_2$ per mole of ethylbenzene is continuously added at a LHSV of 2. Substantial conversion of ethylbenzene to the three xylene isomers is observed.

ILLUSTRATION IV

Another portion of the catalyst produced by Illustration I is used to isomerize ortho-xylene to para-xylene. The reactor is maintained at a temperature of 400° C. and a pressure of 300 p.s.i.g. as ortho-xylene, commingled with 8 moles of $H_2$ per mole of ortho-xylene is passed to the reactor at a liquid hourly spaced velocity (LHSV) of 4.0 hr.$^{-1}$. Substantial conversion—i.e. approximately 90% of equilibrium conversion—of ortho-xylene to para-xylene is obtained.

ILLUSTRATION V

Another portion of the catalyst of Illustration I is used to isomerize normal butane at a pressure of 300 p.s.i.g., a temperature of 225° C., a hydrogen to hydrocarbon mole ratio of about 0.5:1 and a LHSV of about 1.0 hr.$^{-1}$. Substantial isomerization of n-butane to isobutane is noted at these conditions—approximately a conversion of n-butane to isobutane of about 48 wt. percent of charge.

ILLUSTRATION VI

Another portion of the catalyst produced in Illustration I is placed in an appropriate continuous isomerization reactor maintained at a pressure of about 400 p.s.i.g. and a temperature of about 150° C. Normal hexane is continuously charged to the reactor and an analysis of the product stream shows substantial conversion to 2,2-dimethylbutane, 2,3-dimethylbutane, 2-methylpentane, and 3-methylpentane.

ILLUSTRATION VII

Another portion of the catalyst produced in Illustration I is placed in an appropriate continuous isomerization reactor maintained at a pressure of about 400 p.s.i.g. and a temperature of about 300° C. Methylcyclopentane is continuously passed to this reactor, and a substantial portion of it is converted to cyclohexane.

ILLUSTRATION VIII

A portion of the catalyst produced in Illustration I is used to isomerize 1-butene at a pressure of about 250 p.s.i.g., a hydrogen to hydrocarbon mole ratio of about 0.2:1 and a temperature of about 110° C. in an appropriate continuous isomerization reactor. Substantial conversion to 2-butene is obtained.

ILLUSTRATION IX

Another portion of the catalyst prepared in Illustration I is charged to an appropriate continuous isomerization reactor maintained at a pressure of about 250 p.s.i.g., a hydrogen to hydrocarbon mole ratio of about 0.2:1 and a temperature of about 120° C. 3-methyl-1-butene is continuously passed to this reactor and a substantial conversion to 2-methyl-2-butene is obtained.

ILLUSTRATION X

A further portion of the catalyst as prepared in Illustration I is charged to an appropriate hydroisomerization reactor maintained at a temperature of about 220° C. and a pressure of about 450 p.s.i.g. A 4:1 hydrogen to 2-pentene mole ratio charge stock is continuously passed to the reactor with a substantial conversion to isopentane being observed.

ILLUSTRATION XI

Two hundred grams of the reduced platinum-germanium-mordenite-alumina composite of Illustration I are placed in a glass-lined rotating autoclave along with 150 grams of anhydrous aluminum chloride. The autoclave is sealed, pressured with 25 p.s.i.g. of hydrogen, and heated and rotated for 2 hours at 300° C. The autoclave is then allowed to cool, depressured through a caustic scrubber, opened and the final composite removed therefrom. An analysis of the resultant composite indicates about a 15 wt. percent gain based on the original platinum-germanium composite equivalent to the aluminum chloride sublimed and reacted thereon. The caustic scrubber is found to have adsorbed hydrogen chloride equivalent to about 5.0 wt. percent of the original composite corresponding to about 0.8 mole of HCl evolved per mole of aluminum chloride reacted therewith.

ILLUSTRATION XII

A portion of the catalyst prepared in Illustration XI is placed in an appropriate continuous-flow fixed-bed pilot plant isomerization reactor and used to isomerize normal butane. The normal butane is continuously passed to the reactor at a 1.5 liquid hourly space velocity, a 0.5 hydrogen to hydrocarbon mole ratio while the reactor is maintained at a reactor pressure of 450 p.s.i.g. and a reactor temperature of 200° C. Substantial conversion of normal butane to isobutane is observed . . . i.e., approximately a conversion of normal butane to isobutane of about 45 wt. percent of the original normal butane charged to the reactor.

We claim as our invention:

1. A catalytic composite consisting essentially of catalytically effective amounts of a platinum group component, a Group IV-A metal component and a Friedel-Crafts metal halide component combined with a carrier material consisting essentially of an alumina matrix containing uniformly dispersed therein finely-divided zeolitic crystalline aluminosilicate, said carrier material being derived from a sol with which zeolitic crystalline aluminosilicate has been mixed in powdered form, said crystalline aluminosilicate being present in an amount of from about 0.5 to about 20 wt. percent of said carrier material, and said Friedel-Crafts metal halide component being combined with said finely divided crystalline aluminosilicate containing alumina carrier material in a manner such that the Friedel-Crafts metal halide component is reacted with the hydroxyl groups of the alumina and crystalline aluminosilicate.

2. The catalytic composite of claim 1 wherein said composite contains, on a Friedel-Crafts metal halide free basis, about 0.01 to about 2 wt. percent platinum group component, 0.01 to about 5 wt. percent Group IV-A metal component and about 1 to about 100 wt. percent Friedel-Crafts metal halide.

3. The catalytic composite of claim 1 wherein said platinum group component is platinum, palladium or compounds thereof and said halide is aluminum chloride.

References Cited

UNITED STATES PATENTS

| | | | |
|---|---|---|---|
| 3,175,022 | 3/1965 | Reitemeier et al. | 260—683.7 X |
| 3,354,078 | 11/1967 | Miale et al. | 260—683.7 X |
| 3,567,656 | 3/1971 | Mitsche | 252—442 |
| 3,112,351 | 11/1963 | Hoekstra | 260—683.7 X |
| 3,464,929 | 9/1969 | Mitsche | 252—455 Z |
| 3,471,412 | 10/1969 | Miale et al. | 252—455 Z |
| 3,583,903 | 6/1971 | Miale et al. | 252—455 Z |
| 3,630,961 | 12/1971 | Wilhelm | 252—442 |
| 3,632,525 | 1/1972 | Rausch | 252—442 |
| 3,649,704 | 3/1972 | Hayes | 252—466 Pt |

DANIEL E. WYMAN, Primary Examiner

W. H. CANNON, Assistant Examiner

U.S. Cl. X.R.

252—455 Z, 466 Pt; 260—683.7